3,147,250
PROCESS FOR PREPARING 11-OXIMINO-Δ⁵ STEROIDS AND PRODUCTS THEREOF
John Edwards, Mexico City, Mexico, assignor to Syntex Corporation, Panama, Panama, a corporation of Panama
No Drawing. Filed July 9, 1962, Ser. No. 208,605
22 Claims. (Cl. 260—239.55)

The present invention relates to novel cyclopentanophenanthrene derivatives and to a novel process for the production thereof.

More particularly, the present invention relates to a process for the production of $\Delta^4$-19-hydroxy-3,11-diketo steroids, from the corresponding $\Delta^4$-19-hydroxy-3-keto-11-unsubstituted steroids and to the novel 11-oximino-19-hydroxy-$\Delta^4$-3-keto intermediates.

The steroids with an oxygen at C–11 are of great importance per se, particularly in the cortical hormone series, and as intermediate compounds for the production of other 11 and/or 9 substituted steroids. Therefore, several processes for the specific introduction of an oxygen atom at C–11 have been devised, in particular microbiological fermentations. In accordance with the present invention the surprising discovery has been made that introduction of an oxygen atom at C–11 is easily accomplished by a process comprising a photolytic step starting with nitrites of 19-hydroxy-$\Delta^4$-3-keto steroids.

The novel process object of the present invention may be exemplified as follows:

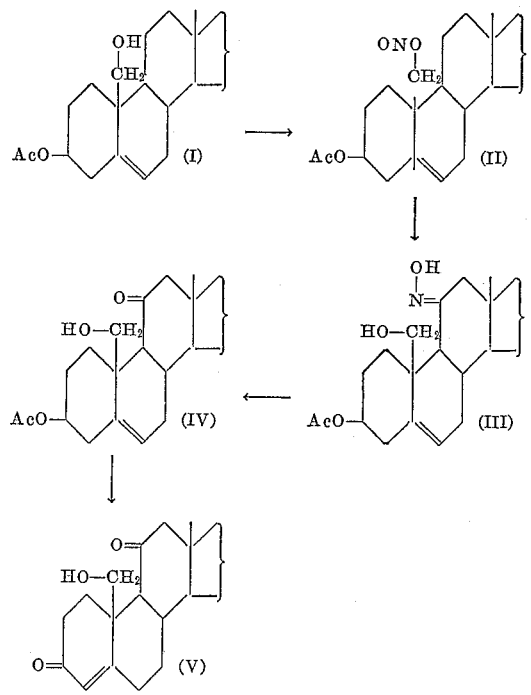

In the above formulas, Ac represents an acyl group of less than 12 carbon atoms, preferably the acetyl group.

The starting compounds (I) of the present invention, which are 19-hydroxy-$\Delta^5$-3-acyloxy steroids are obtained in accordance with Bowers, U.S. pat. application Serial No. 194,716, filed May 14, 1962, now U.S. Patent 3,065,-228, by treatment of the corresponding 3-acyloxy-$\Delta^5$-steroids with hypobromous acid, reaction of the resulting 3-acyloxy-5α-bromo-6β-hydroxy steroid with lead tetraacetate, and treatment of the obtained 3-acyloxy-5α-bromo-6β,19-oxido steroids with zinc in a lower aliphatic alcohol.

These starting compounds may belong to the androstane, pregnane and sapogenin series and a number of substituents may be present in the molecule without interfering with the reaction. For example, at C–17 there may be present a ketone group, a 17β-acyloxy group with or without a substituent at C–17α, a 17β-acetyl group with or without an acyloxy group at C–17α, a dihydroxy acetone side chain preferably protected by 17,20;20,21-bismethylenedioxy grouping, or a sapogenin side chain; at C–16 there may be present an acyloxy group, a methyl group, a double bond between C–16 and C–17, and other similar substituents.

In accordance with the present invention a starting compound of the type described hereinbefore (I) is treated with nitrosyl chloride in a tertiary amine, preferably pyridine, at a temperature between −15° C. and −25° C. approximately, to give the corresponding 19-nitrites (II). The latter nitrites are irradiated with ultraviolet and/or visible light preferably generated with a high pressure mercury arc lamp, for a period of time of the order of 3 hours, the resulting mixture being optionally treated thereafter with a lower aliphatic alcohol such as isopropanol. Conventional isolation of the products, as per evaporation of the solvents followed optionally by chromatography and/or crystallization yields the corresponding 11-oximino-19-hydroxy-$\Delta^5$-3-acyloxy steroid (III). The 11-oximino grouping is hydrolyzed by any of the conventional methods used for hydrolysis of oximes, for example, treatment with a strong organic or mineral acid such as formic acid or hydrochloric acid, thus affording the corresponding 11-keto steroids (IV).

Saponification of these compounds in a basic medium followed by preferential Oppenauer oxidation of the 3,19-dihydroxy-$\Delta^5$-steroids, give rise to the desired 19-hydroxy-$\Delta^4$-3,11-diketo compounds (V).

The 11-keto steroids thus obtained may be further used for the production of the corresponding 11-hydroxy steroids by conventional reduction, for the production of 19-desoxy steroids by conventional tosylation of the 19-hydroxy group followed by reduction with a double metal hydride, and other conventional transformations leading towards important derivatives known to the skilled in the art.

The following specific examples serve to illustrate but are not intended to limit the scope of the present invention:

*Example I*

A solution of 2 g. of the 3-acetate of $\Delta^5$-androstene-3β,19-diol-17-one in 35 cc. of pyridine was kept in a cooling bath at −15 to −25° C. and treated with a stream of nitrosyl chloride, with constant stirring, until a yellow color persisted in the mixture. Thereafter, water was added, the formed precipitate was filtered off and washed with water, then crystallized from acetone-hexane, to give the 3-acetate-19-nitrite of $\Delta^5$-androstene-3β,19-diol-17-one.

*Example II*

A solution of 2 g. of the latter product in 50 cc. of benzene was irradiated, under nitrogen atmosphere, with a 150 w. high pressure mercury arc lamp for 3 hours. The solvent was then evaporated, the residue chromatographed on Florisil, and the solid fractions recrystallized from methylene chloride-hexane thus giving the 3-acetate of 11-oximino-$\Delta^5$-androstene-3β,19-diol-17-one.

*Example III*

The 3-acetate-19-nitrite of $\Delta^5$-androstene-3β,19-diol-17-one was treated in accordance with the foregoing example, except that after the irradiation, 3 cc. of isopropanol were added to the resulting mixture, which was refluxed for 1 hour and then treated in the same manner, to give the acetate of 11-oximino-$\Delta^5$-androstene-3β,19-diol-17-one.

Example IV 1 g. of the latter product was heated on the steam bath with 20 cc. of 60% formic acid for 1 hour, cooled, diluted with water and the precipitate was collected, washed with water, dried, and recrystallized from acetone-hexane, thus affording the 3-acetate of $\Delta^5$-androsten-$3\beta$,19-diol-11,17-dione.

Example V

The technique described in Example IV was repeated, except that the formic acid was substituted by a 10% solution of hydrochloric acid in ethanol, thus yielding the same product.

Example VI

A solution of 2 g. of the 3-acetate of $\Delta^5$-androstene-$3\beta$,-19-diol-11,17-dione in 50 cc. of methanol was treated with 5 cc. of a 4% aqueous potassium hydroxide solution and the reaction mixture was stirred at 0° C. for 1 hour under atmosphere of nitrogen; the mixture was then neutralized with acetic acid and the methanol was distilled under reduced pressure.

The residue was triturated with water and the solid was collected, washed with water, dried and crystallized from ethyl acetate-methanol, thus yielding $\Delta^5$-androstene-$3\beta$,19-diol-11,17-dione.

A solution of 1 g. of the foregoing compound in 10 cc. of toluene and 2 cc. of cyclohexanone was dried by distillation of 3 cc. of the solvent mixture, there was added a solution of 250 mg. of aluminum isopropoxide dissolved in 2 cc. of anhydrous toluene and ½ cc. of cyclohexanone and the mixture was refluxed for 10 minutes; there was added 1 cc. of acetic acid and the solvents were eliminated by steam distillation. The product was extracted several times with ethyl acetate and the organic extracts were washed with a 5% hydrochloric acid solution, then with water, 10% sodium carbonate solution and water to neutral, it was dried over anhydrous sodium sulfate and evaporated to dryness. By crystallization from acetone-hexane there was obtained the $\Delta^4$-androsten-19-ol-3,11,17-trione, in 80% yield.

Example VII

The starting compounds listed under I, which were prepared in accordance with our copending patent application Serial No. 194,716 filed May 14, 1962 now U.S. Patent No. 3,065,228 were treated in accordance with Example I, thus affording the corresponding products set forth under II.

| I | II |
|---|---|
| 3-acetate of $\Delta^5$-pregnene-$3\beta$,19-diol-20-one. | The 19-nitrite-3-acetate of $\Delta^5$-pregnene-$3\beta$,19-diol-20-one. |
| 3-acetate of $16\alpha$-methyl-$\Delta^5$-pregnene-$3\alpha$,19-diol-20-one. | The 19-nitrate-3-acetate of $16\alpha$-methyl-$\Delta^5$-pregnene-$3\beta$,19-diol-20-one. |
| 3-acetate of $16\beta$-methyl-$\Delta^5$-pregnene-$3\beta$,19-diol-20-one. | The 19-nitrite-3-acetate of $16\beta$-methyl-$\Delta^5$-pregnene-$3\beta$,19-diol-20-one. |
| 3-acetate of $16\alpha$,$17\alpha$-isopropylidenedioxy-$\Delta^5$-pregnene-$3\beta$,19-diol-20-one. | The 19-nitrite-3-acetate of $16\alpha$,$17\alpha$-isopropylidenedioxy-$\Delta^5$-pregnene-$3\beta$,19-diol-20-one. |
| 3,17-diacetate of $\Delta^5$-pregnene-$3\beta$,$17\alpha$,19-triol-20-one. | The 19-nitrite-3,17-diacetate of $\Delta^5$-pregnene-$3\beta$,$17\alpha$,19-triol-20-one. |
| 3,17-diacetate of $16\alpha$-methyl-$\Delta^5$-pregnene-$3\beta$,$17\alpha$,19-triol-20-one. | The 19-nitrite-3,17-diacetate of $16\alpha$-methyl-$\Delta^5$-pregnene-$3\beta$,$17\alpha$,19-triol-20-one. |
| 3-acetate of $\Delta^{5,16}$-pregnadiene-$3\beta$,19-diol-20-one. | The 19-nitrite-3-acetate of $\Delta^{5,16}$-pregnadiene-$3\beta$,19-diol-20-one. |
| 3-acetate of 19-hydroxy-diosgenin. | The 19-nitrite-3-acetate of 19-hydroxy-diosgenin. |
| 3,17-diacetate of $17\alpha$-ethinyl-$\Delta^5$-androstene-$3\beta$,$17\beta$,19-triol-3-one. | The 19-nitrite-3,17-diacetate of $17\alpha$-ethinyl-$\Delta^5$-androstene-$3\beta$,$17\beta$,19-triol-3-one. |

Example VIII

The compounds produced in accordance with Example VII were treated following the procedure of Example II, thus yielding respectively: The 3-acetate of 11-oximino-$\Delta^5$-pregnene-$3\beta$,19-diol-20-one, the 3-acetate of 11-oximino-$16\alpha$-methyl-$\Delta^5$-pregnene-$3\beta$,19-diol-20-one, the 3-acetate of 11-oximino-$16\beta$-methyl-$\Delta^5$-pregnene-$3\beta$-19-diol-20-one, the 3-acetate of 11-oximino-$16\alpha$,$17\alpha$-isopropylidenedioxy-$\Delta^6$-pregnene $3\beta$,19-diol-20-one, the 3,17-diacetate of 11-oximino-$\Delta^5$-pregnene-$3\beta$,$17\alpha$,19-triol-20-one, the 3,17-diacetate of 11-oximino-$16\alpha$-methyl-$\Delta^5$-pregnene-$3\beta$,$17\alpha$,19-triol-20-one, the 3-acetate of 11-oximino-$\Delta^{5,16}$-pregnadiene-$3\beta$,19-diol-20-one, the 3-acetate of 11-oximino-19-hydroxydiosgenin and the 3,17-diacetate of 11-oximino-$17\alpha$-ethinyl-$\Delta^5$-androstene-$3\beta$,$17\beta$,19-triol.

Example IX

The compounds obtained in the preceding example were treated with 60% formic acid by following the method of Example IV, to produce respectively: the 3-acetate of $\Delta^5$-pregnene-$3\beta$,19-diol-11,20-dione, the 3-acetate of $16\alpha$-methyl-$\Delta^5$-pregnene-$3\beta$,19-diol-11,20-dione, the 3 acetate of $16\beta$-methyl-$\Delta^5$-pregnene-$3\beta$,19-diol-11,20-dione, the 3-acetate of $\Delta^5$-pregnene-$3\beta$,$16\alpha$,$17\alpha$,19-tetrol-11,20-dione, the 3,17-diacetate of $\Delta^5$-pregnene-$3\beta$,$17\alpha$,19-triol-11,20-dione, the 3,17-diacetate of $16\alpha$-methyl-$\Delta^5$-pregnene-$3\beta$,$17\alpha$,19-triol-11,20-dione, the 3-acetate of $\Delta^{5,16}$-pregnadiene-$3\beta$,19-diol-11,20-dione, the 3-acetate of 19-hydroxy-11-keto-diosgenin, the 3,17-diacetate of $17\alpha$-ethinyl-$\Delta^5$-androstene-$3\beta$,$17\beta$,19-triol-11-one.

Example X

The final products of Example IX were treated in accordance with Example VI, giving respectively: $\Delta^4$-pregnen-19-ol-3,11,20-trione, $16\alpha$ - methyl - $\Delta^4$-pregnen-19-ol-3,11,20-trione, $16\beta$-methyl-$\Delta^4$-pregnen - 19-ol-3,11,20-trione, $\Delta^4$ - pregnene-$16\alpha$,$17\alpha$,19-triol-3,11,20-trione, 17-acetate of $\Delta^4$-pregnene-$17\alpha$,19-diol-3,11,20-trione, 17-acetate of $16\alpha$-methyl - $\Delta^4$-pregnene - $17\alpha$,19-diol-3,11,20-trione, $\Delta^{4,16}$-pregnadien-19-ol-3,11,20-trione, 19-hydroxy-11-keto-diosgenone, 17-acetate of $17\alpha$-ethinyl-$\Delta^4$-androstene-$17\beta$,19-diol-3,11-dione.

Example XI

The technique described in Example V was repeated, except that the hydrochloric acid was substituted by nitrous acid, thus yielding an identical product.

Example XII

By following the methods described in Examples I, II and V, 2 g. of the 3-acetate of 17,20; 20,21-bismethylenedioxy-$\Delta^5$-pregnene-$3\beta$,19-diol were converted successively into the 19-nitrite-3-acetate of 17,20; 20,21-bismethylenedioxy-$\Delta^5$-pregnene-$3\beta$,19-diol, the 3-acetate of 11-oximino-17, 20; 20,21-bis-methylenedioxy-$\Delta^5$-pregnene-$3\beta$,19-diol and the 3-acetate of 17,20; 20,21-bis-methylenedioxy-$\Delta^5$-pregnene-$3\beta$,19-diol-11-one.

The preceding compound was then saponified and the resulting free compound oxidized under Oppenauer conditions, in accordance with the method of Example VI, to produce 17,20; 20,21-bis-methylenedioxy-$\Delta^4$-pregnen-19-ol-3,11-dione.

Upon hydrolysis of the bis-methylenedioxy group with 60% formic acid there was obtained as final product $\Delta^4$-pregnene-$17\alpha$,19,21-triol-3,11,20-trione.

I claim:

1. In the process for the production of 19-hydroxy-$\Delta^4$-3,11-diketo steroids the step which comprises reacting a 19-hydroxy-$\Delta^5$-3-acyloxy steroid selected from the group consisting of the androstane, pregnane and sapogenin series with nitrosyl chloride to give the corresponding 19-nitrite.

2. In the process for the production of 19-hydroxy-$\Delta^4$-3,11-diketo steroids, the step which comprises irradiating a 19-nitrite of a 19-hydroxy-$\Delta^5$-3-acyloxy steroid selected from the group consisting of the androstane, pregnane and sapogenin series with light selected from the group consisting of visible and ultra-violet light, to give the corresponding 11-oximino-19-hydroxy-$\Delta^5$-3-acyloxy steroid.

3. The process step of claim 2, wherein the irradiation is followed by treatment with a lower aliphatic alcohol.

4. In the process for the production of 19-hydroxy-$\Delta^4$-3,11-diketo steroids the step which comprises treating an 11-oximino-19-hydroxy-$\Delta^5$-3-acyloxy steroid selected from the group consisting of the androstane, pregnane and sapogenin series with an acid selected from the group consisting of strong organic acids and strong mineral acids, to produce the corresponding 19-hydroxy-$\Delta^5$-3-acyloxy-11-keto steroid.

5. The process step of claim 2, wherein the irradiation is produced by a high pressure mercury arc lamp.

6. The process step of claim 4, wherein the acid is formic acid.

7. The process step of claim 4, wherein the acid is hydrochloric acid.

8. The process step of claim 4, wherein the acid is nitrous acid.

9. The 3-acetate of 11-oximino-$\Delta^5$-androstene-3$\beta$,19-diol-17-one.

10. The 3-acetate of 11-oximino-$\Delta^5$-pregnene-3$\beta$,19-diol-20-one.

11. The 3-acetate of 11-oximino-16$\alpha$-methyl-$\Delta^5$-pregnene-3$\beta$,19-diol-20-one.

12. The 3-acetate of 11-oximino-16$\beta$-methyl-$\Delta^5$-pregnene-3$\beta$,19-diol-20-one.

13. The 3-acetate of 11-oximino-16$\alpha$,17$\alpha$-isopropylidenedioxy-$\Delta^5$-pregnene-3$\beta$,19-diol-20-one.

14. The 3,17-diacetate of 11-oximino-$\Delta^5$-pregnene-3$\beta$,17$\alpha$,19-triol-20-one.

15. The 3,17-diacetate of 11-oximino-16$\alpha$-methyl-$\Delta^5$-pregnene-3$\beta$,17$\alpha$,19-triol-20-one.

16. The 3-acetate of 11-oximino-$\Delta^{5,16}$-pregnadiene-3$\beta$,19-diol-20-one.

17. The 3-acetate of 11-oximino-17,20; 20,21-bismethylenedioxy-$\Delta^5$-pregnene-3$\beta$,19-diol.

18. The 3-acetate of 11-oximino-19-hydroxy-diosgenin.

19. The 3,17-diacetate of 11-oximino-17$\alpha$-ethinyl-$\Delta^5$-androstene-3$\beta$,17$\beta$,19-triol.

20. A process for the production of 19-hydroxy-$\Delta^4$-3,11-diketo steroids which comprises:
  (1) reacting a 19-hydroxy-$\Delta^5$-3-acyloxy steroid selected from the group consisting of the androstane, pregnane and sapogenin series with nitrosyl chloride to give the corresponding 19-nitrite,
  (2) irradiating said 19-nitrite with light selected from the group consisting of visible light and ultraviolet light to give the corresponding 11-oximino-19-hydroxy-$\Delta^5$-3-acyloxy steroid, and
  (3) heating said 11-oximino steroid with an acid selected from the group consisting of strong organic acids and strong mineral acids to produce the corresponding 19-hydroxy-$\Delta^5$-3-acyloxy-11-keto steroid.

21. The process of claim 20 wherein irradiation is carried out using visible light.

22. The process of claim 20 wherein irradiation is carried out using ultraviolet light.

References Cited in the file of this patent

Barton et al.: J.A.C.S., vol. 83, 1961, 4076–4083.